J. C. KROMER.
STARTING, STOPPING, AND POWER CONTROLLING CLUTCH COMBINATION.
APPLICATION FILED JAN. 22, 1913.

1,125,695.

Patented Jan. 19, 1915.

2 SHEETS—SHEET 1.

Witnesses
Hugh H. Ott
P. M. Smith

Inventor
J. Carl Kromer
By Victor J. Evans
Attorney

J. C. KROMER.
STARTING, STOPPING, AND POWER CONTROLLING CLUTCH COMBINATION.
APPLICATION FILED JAN. 22, 1913.
1,125,695.
Patented Jan. 19, 1915.
2 SHEETS—SHEET 2.
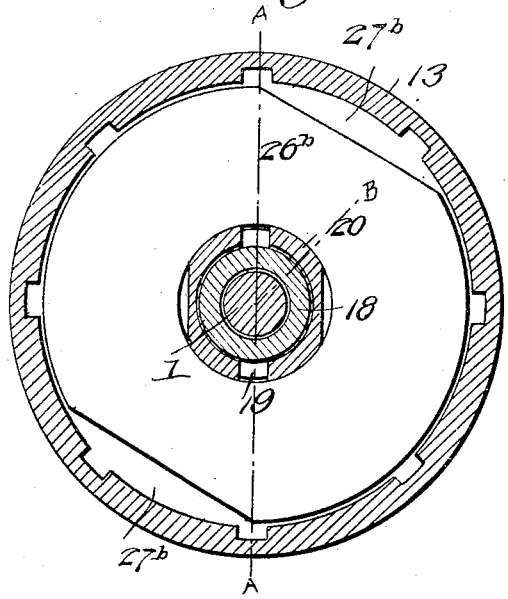
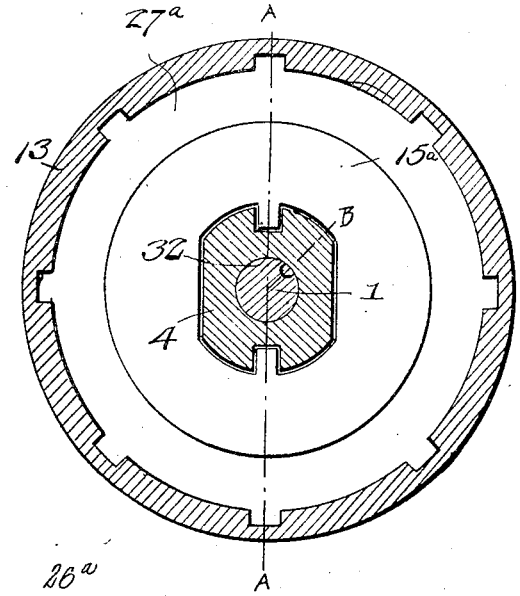
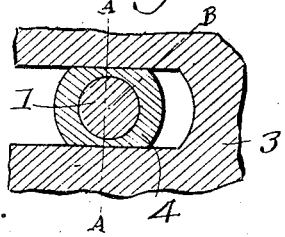
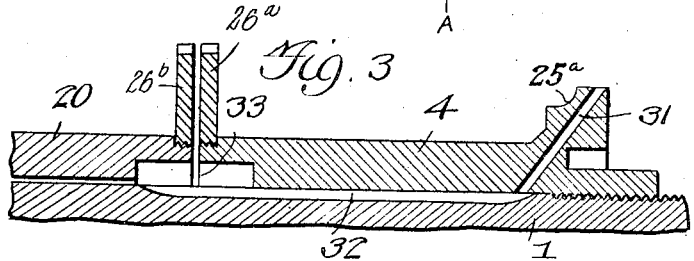
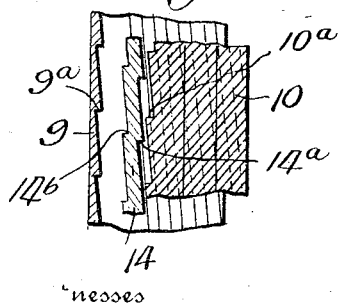
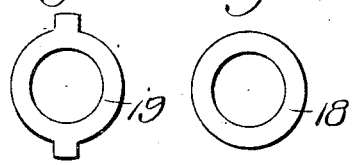
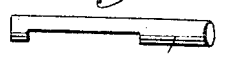
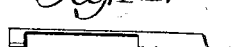
Inventor
J. Carl Kromer
By Victor J. Evans
Attorney
Witnesses
Hugh H. Ott
P. M. Smith

UNITED STATES PATENT OFFICE.

JOHN CARL KROMER, OF ELGIN, ILLINOIS.

STARTING, STOPPING, AND POWER-CONTROLLING CLUTCH COMBINATION.

1,125,695.  Specification of Letters Patent.  Patented Jan. 19, 1915.

Application filed January 22, 1913. Serial No. 743,612.

*To all whom it may concern:*

Be it known that I, JOHN CARL KROMER, a citizen of the United States, residing at Elgin, in the county of Kane and State of Illinois, have invented new and useful Improvements in Starting, Stopping, and Power-Controlling Clutch Combinations, of which the following is a specification.

This invention relates to combination clutches, the object in view being to provide a simple, compact and reliable device, embodying a transmission or motor clutch, a starting clutch, and a brake, together with means for controlling the motor and starting clutches, and the brake, so that they may be used simultaneously or independently, according to the requirements.

In the embodiment of this invention, illustrated in the accompanying drawings, the device is shown as especially designed for use on motorcycles, as it enables the rider to release the power clutch and apply the brake by moving the pedals backward, or by moving a hand lever, at his option, or he may set the hand lever to slip the clutch slightly and still use the pedal to free the clutch and apply the brake, this being especially advantageous in traveling over rough roads.

The device also enables the clutch to be freed by hand, and the machine pedaled or propelled, after the manner of an ordinary bicycle, without driving the engine.

With the above and other objects in view, the invention consists in the construction, combination and arrangement of parts, as will be hereinafter more fully described, illustrated in the accompanying drawings, and pointed out in the claims hereunto appended.

Figure 1:
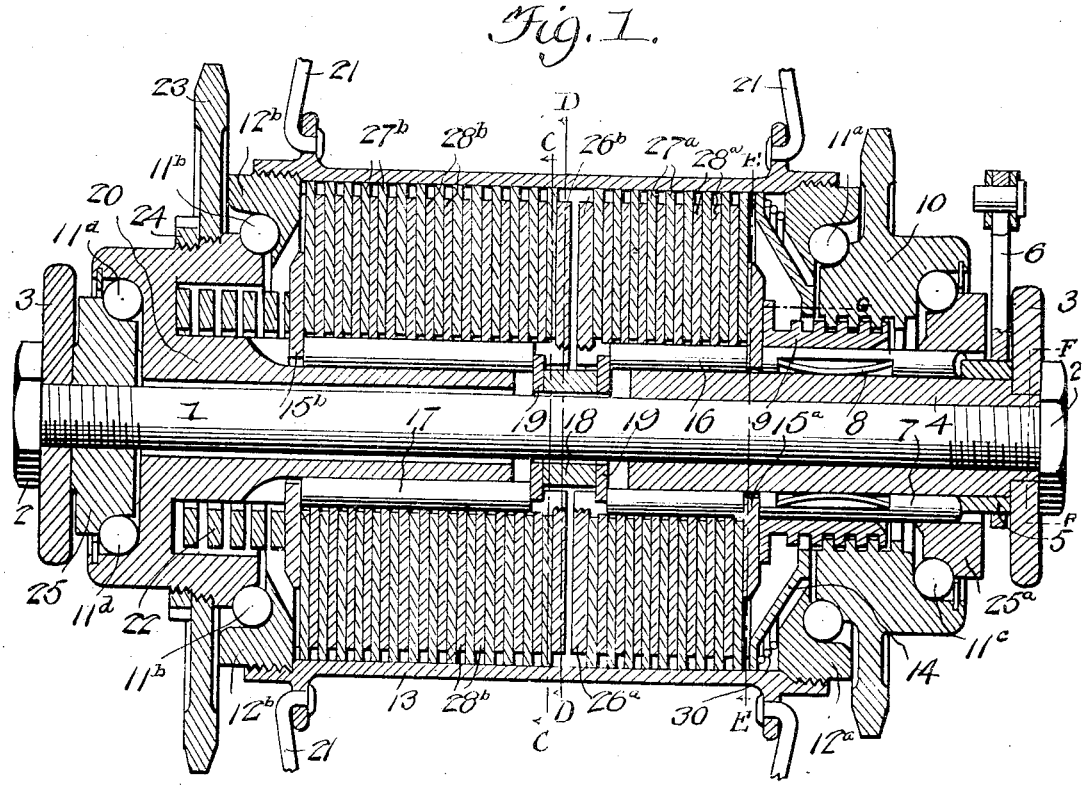
Figure 5:
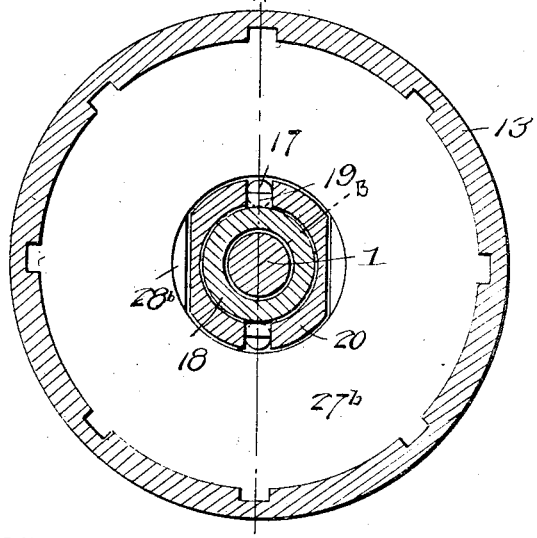
Figure 8:
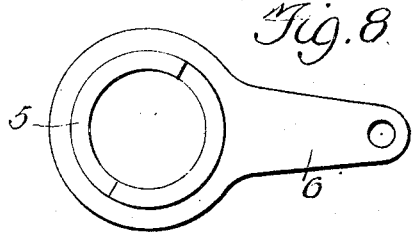
Figure 9:
Figure 10:

In the drawings: Figure 1 is a sectional view of the combination clutch, said section being taken diametrically and longitudinally of the axle on the line A of Figs. 2, 5, 6 and 7. Fig. 2 is a detail section on the line F of Fig. 1. Fig. 3 is a longitudinal section on the line B of Figs. 2, 5, 6 and 7. Fig. 4 is a detail longitudinal section on the line G of Fig. 1. Fig. 5 is a cross section on the line C of Fig. 1. Fig. 6 is a cross section on the line D of Fig. 1. Fig. 7 is a cross section on the line E of Fig. 1. Fig. 8 is a face or plan view of the hand operated cam. Fig. 9 is an edge view thereof. Fig. 10 is an end elevation of the same. Fig. 11 is a plan view of one of the push pins. Fig. 12 is a similar view of another push pin. Fig. 13 is a side elevation of the initial push pin. Fig. 14 is an elevation of the same, taken at right angles to Fig. 13. Fig. 15 is a side elevation of one of the side members of the central thrust bearing. Fig. 16 is a similar view of the central member of the thrust bearing. Fig. 17 is an edge view of the spring which operates on the recessed push pin.

Referring to the drawings, 1 designates the stationary axle of a motorcycle, the combination clutch hereinafter specifically described being particularly adapted for use on motorcycles. This axle passes through the side frame members 3, as shown, and is secured firmly in position by means of nuts 2. Surrounding the axle 1 and concentric therewith is a circular casing 13 which in a motorcycle forms the hub of the wheel, from which the spokes 21 extend outwardly to the felly or rim of the wheel.

4 designates a stationary sleeve or hollow shaft which closely embraces the axle 1 and extends nearly to the center of the hub casing 13. In longitudinal alinement with the stationary sleeve 4 is a rotary power transmission member 20 which is mounted to turn upon the stationary axle, said member being provided with a sprocket wheel 23 which is threaded thereon, as shown, and further secured by means of a locking ring or nut 24, the thread of which extends reversely to the thread of the sprocket wheel 23.

The member 20 is provided with a ball cup at its outer side, receiving a circular series of anti-friction balls $11^d$ which bear upon a cone 25 threaded on the axle 1 and inside of the frame 3. The member 20 is also provided with a ball cup to receive a circular series of anti-friction balls $11^b$ which support a cone $12^b$ threaded into the end of the hub casing 13, as clearly shown in Fig. 1.

At the opposite end of the casing 13, another ball cone $12^a$ is threaded into the same, and is supported by a circular series of anti-friction balls $11^a$ which bear against the cupped inner face of a starting and braking sprocket wheel 10. This wheel is cupped at its outer side to receive another circular series of anti-friction balls $11^c$ supported by the sleeve 4. The ball cones $12^a$ and $12^b$ are tapered at their inner edges, so as to form a tight fitting taper seat in the opposite ends of the hub casing 13, thereby forming a liquid tight joint which will serve to retain oil or other lubricating material within the casing 13, as a whole.

27ᵇ and 28ᵇ represent the disks of a multiple disk clutch, the disks 27ᵇ being splined to the casing 13, as shown in Fig. 5, and the disks 28ᵇ being splined to the member 20, so that when the disks are forced tightly together by means hereinafter described, the casing 13 will be taken up and driven by the member 20 which is connected to the motor by a sprocket chain leading from the motor to the sprocket wheel 23, said motor and sprocket chain not being shown, but being arranged in the usual manner.

The brake used for illustration is also of the multiple disk type, and is composed of the disks 27ᵃ which are splined to the hub casing 13, and alternating disks 28ᵃ which are splined to the stationary sleeve 4, above referred to, so that when said disks are pinched together, they will have a braking effect between said casing and axle for bringing the wheel to a stop.

At the outer end of the multiple disk clutch is a follower disk 15ᵇ which is pressed inwardly by a coiled spring 22 arranged in a recess in the member 20, as shown in Fig. 1. Arranged about centrally within the casing 13 is an abutment disk 26ᵇ which is attached to the member 20, the disks 27ᵇ and 28ᵇ being pinched or clamped between said abutment disk and the follower disk 15ᵇ by the action of the spring 22.

Arranged adjacent to the abutment disk 26ᵇ and attached to the stationary sleeve 4 is another abutment disk 26ᵃ, against which the disks 27ᵃ and 28ᵃ are pressed. Outside of said disks, is arranged a follower disk 15ᵃ which is movable toward and away from the abutment disk 26ᵃ by the means hereinafter particularly described.

Extending around the stationary sleeve 4 is a thrust collar 9 having an enlarged flange at its inner end which bears directly against the follower disk 15ᵃ. The disk 15ᵃ is adapted to move the push pin 16 in advance of it, and the motion of said pins 16 is transmitted to another pair of push pins 17 at the opposite side, by means of a central thrust bearing composed of a central annular member 18 and two side members 19 provided with diametrically opposite projections which are engaged by the pins 16 and 17, as they are thrust lengthwise of the axle. This central thrust bearing acts as a means for transmitting the movements of the pins 16 to the pins 17, and vice versa.

In order to impart movement to the thrust collar 9, the wheel 10 is threaded thereon, as shown in Fig. 1, and therefore, as said wheel 10 is turned rearwardly in the act of back pedaling, the collar 9 is thrust inwardly, forcing ahead of it the parts 15ᵃ, 16, 18, 17 and 15ᵇ, thus compressing the spring 22 and relieving the pressure on the power clutch, while applying pressure to the brake. In other words, this movement releases the clutch and sets the brake.

In order to perform the same operation by hand, a cam 5 is mounted on the sleeve 4 adapted to coöperate with the diametrically opposite push pins 7, said cam being provided with a lever extension 6, from which a suitable connection may lead to a lever or other hand grip device on the handle bar of the machine. It will be observed that the push pins 7 are each provided with a recess in one side to receive a spring 8 which bears against the fixed sleeve 4. The springs 8 serve to force the pins 7 outwardly radially against the inner surface of the thrust collar 9, thereby serving to hold said collar normally stationary, the resistance, however, being easily overcome by either of the operating devices 10 and 5, hereinabove described.

The device is also adapted to be used as a starter, and in order to accomplish this, the wheel 10 is provided on its inner face with teeth 10ᵃ, as shown in Fig. 4, which are adapted to engage corresponding teeth 14ᵃ on the adjacent face of the disk 14 mounted within the adjacent end of the casing 13. The disk 14 is also provided on its opposite face with teeth 14ᵇ, as shown, which are adapted to engage corresponding teeth 9ᵃ on the face of the flange of the thrust collar 9. It is essential that all of these teeth have one side approximately parallel with the pitch of the thread connecting parts 9 and 10, as shown in Fig. 4, where the dotted lines represent the pitch of the thread. A spring 30 serves to normally press the disk 14 against an internal annular shoulder within the casing 13. It will now be observed that when the wheel 10 is driven in a forward direction by the pedals, the thrust collar 9 will move toward the wheel 10 and the teeth on the parts 9 and 14 will engage firmly, owing to the pressure of the spring 30, before the disk 14 begins to move toward the wheel 10. Hence, the teeth of parts 14 and 10 will always approach each other in the same relative position and direction, and being properly shaped and placed, will always engage to the full depth of the teeth without friction, and the sprocket wheel 10 will drive the casing 13. When the casing 13 rotates faster than the wheel 10, the teeth will separate without jamming in the following manner: The teeth engaging parts 9 and 14 will cause the collar 9 to rotate with the disk 14, hence, faster than the wheel 10, thereby causing the collar 9 to move away from the wheel 10 until all teeth are disengaged.

This type of starting clutch has the advantage over ordinary ratchets that it produces no friction when not driving. Its advantage over the type commonly used in motorcycle hubs is explained as follows: If the disk 14 were made fast in the casing 13, so that it would not touch the wheel 10 and no teeth were used, it would be like the type commonly used and there would be a great longitudinal thrust on the bearing 11ª, and the parts 9 and 10 and 14 would have to be correspondingly strong. In the device commonly used on motorcycles, this longitudinal thrust is considerably diminished by using a large (rapid) pitch for the thread connecting parts 9 and 10, but a small (slow) pitch is desirable in this combination, in order to avoid jerking in applying the power clutch, hence, other means of reducing the longitudinal thrust are desired. This is accomplished by the use of teeth and by making the disk 14 movable toward the wheel 10, as above described. Incidentally the longitudinal thrust is removed from the bearing 11ª, excepting only that produced by the spring 30, which is very slight. The final advantage is to diminish the weight and size of the machine.

Oil or other lubricating material is introduced to the working parts through an oil hole 31 which communicates with a longitudinal groove 32 in the stationary axle 1, the oil finding its way outwardly through one or more ports 33 into the spaces occupied by the thrust bearing, the clutch, and the brake, this being especially desirable when the machine is traveling over bad roads, in order that the thrust bearing and clutch may be properly lubricated to provide for the frequent slipping of the clutch.

From the foregoing description, it will be seen that when the device is used on a motorcycle, the rider is enabled to release the power clutch and apply the brake by moving the pedals backwardly, or by moving a hand lever, at his option. If desired, he may set the hand lever to slip the clutch a little, and still use the pedals to free the clutch and apply the brake, this being particularly advantageous in traveling over rough roads. If desired, the clutch may be set free by the hand lever, and the machine pedaled like an ordinary bicycle, without driving the engine.

In place of the sprocket 23, a belt pulley may be used. Further, if desired, the parts may be rearranged, so that the pedals will drive the engine instead of the wheel, this arrangement being especially desirable for use on motorcycles employing a side car, as it makes it possible to start the engine, without lifting the wheel off the ground or propelling the machine. This arrangement may be effected by making the sleeve 4 extend as an axle through the power transmission member 20, and placing the parts 5, 6, 7, 8, 9, 10 and 14 to the opposite side of the power transmission wheel 23, and placing the spring 22 at the opposite side of the clutch, making 14 drive 20 instead of 13. The spring 22 may be attached to the casing 13 instead of to the power member 20.

It is also possible to substitute any of several types of clutch or brake, for instance, expanding cylinder, contracting band, or cone clutch, or brake. Also, other types of starting clutch may be substituted. I have chosen the multiple disk type of clutch and brake for illustration, believing it to be superior for the purpose, but knowing that other types can be made to give good service in this combination. This type of starting clutch is shown because it is believed to be new and superior to any type now known to the public, and especially valuable in this combination.

What is claimed is:

1. A combination clutch comprising a stationary axle, a rotary hollow cylindrical casing concentric therewith, a rotary power transmission member concentric with the axle, a clutch, a brake, both the clutch and brake surrounding the axle within said casing, means for holding said clutch normally set and the brake normally off, and means for throwing out the clutch and throwing on the brake.

2. A combination clutch, comprising a stationary axle, a rotary circular casing concentric therewith, a rotary power transmission member concentric with the axle, a power transmission wheel fast on said power transmission member, a clutch connecting the casing and power transmission member, a brake connecting the casing and axle, means for holding the clutch set and the brake released, a thrust collar movable lengthwise of the axle, and a pedal controlled sprocket having a threaded engagement with said collar and acting to cause said collar to release the clutch and set the brake.

3. A combination clutch, comprising a stationary axle, a rotary circular casing concentric therewith, a rotary power transmission member concentric with the axle, a power transmission wheel fast on said power transmission member, a clutch connecting the casing and power transmission member, a brake connecting the casing and axle, a spring acting to hold the clutch set and the brake released, and a lever operated cam and connections for releasing the clutch and setting the brake.

4. A combination clutch, comprising a stationary axle, a rotary circular casing concentric therewith, a rotary power transmission member concentric with the axle, a power transmission wheel fast on said power transmission member, a clutch connecting the casing and power transmission member, a brake connecting the casing and axle, means for holding the clutch set and the brake released, a pedal controlled sprocket, ratchet elements interposed between said sprocket and the casing whereby a driving engagement may be obtained between the sprocket and casing, and means whereby reverse rotation of the sprocket will release the clutch and set the brake.

5. A combination clutch, comprising a stationary axle, a rotary circular casing concentric therewith, a rotary power transmission member concentric with the axle, a power transmission wheel fast on said power transmission member, a clutch connecting the casing and power transmission member, a brake connecting the casing and axle, means for holding the clutch set and the brake released, a pedal controlled sprocket, ratchet elements interposed between said sprocket and the casing whereby a driving engagement may be obtained between the sprocket and casing, and a throw-off spring for disengaging said ratchet elements when the casing rotates faster than the sprocket and to cause proper engagement of the ratchet elements when the sprocket rotates faster than the casing.

6. A combination clutch, comprising a stationary member, a rotary driven member, a rotary power transmission member concentric with the aforesaid members, and ratchet mechanism embodying a driving member, a driven member, and an auxiliary member, each of said ratchet members having teeth, the teeth on the driven member engaging the teeth on the driving member and teeth on the driven member engaging the teeth on the auxiliary member, said auxiliary member having also a threaded engagement with the driving member.

7. A combination clutch, comprising a stationary axle, a rotary circular casing, a rotary power transmission member concentric with the axle, a clutch, a brake, and ratchet mechanism embodying a driving member, a driven member, and an auxiliary member, each of said ratchet members having teeth, the teeth on the driven member engaging the teeth on the driving member and teeth on the driven member engaging the teeth on the auxiliary member, said auxiliary member having also a threaded engagement with the driving member and a frictional engagement with a stationary member.

8. A combination clutch, comprising a stationary member, a rotary driven member, a rotary power transmission member, a clutch, a brake, ratchet mechanism embodying a driving member, a driven member, and an auxiliary member, each of said ratchet members having teeth, the teeth on the driven member engaging the teeth on the driving member and teeth on the driven member engaging the teeth on the auxiliary member, said auxiliary member having also a threaded engagement with the driving member and a frictional engagement with the stationary member, and means for disengaging the driven member from the driving member and for causing correct engagement between the teeth of said members, all of said member being concentric.

9. A combination clutch, comprising a stationary member, a rotary driven member, a rotary power transmission member concentric with the aforesaid members, and ratchet mechanism embodying a driving member, a driven member, and an auxiliary member, each of said ratchet members having teeth, the teeth on the driven member engaging the teeth on the driving member and teeth on the driven member engaging the teeth on the auxiliary member, said auxiliary member having also threaded engagement with the driving member and frictional engagement with the stationary member, and means for disengaging the driven member from the driving member.

In testimony whereof I affix my signature in presence of two witnesses.

JOHN CARL KROMER.

Witnesses:
   JOHN C. KROMER,
   GRANT WERTZ.